US009689495B2

(12) United States Patent
Zhang et al.

(10) Patent No.: US 9,689,495 B2
(45) Date of Patent: Jun. 27, 2017

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: Zhen J. Zhang, West Bloomfield, MI (US); Paul G. Otanez, Franklin, MI (US); Shushan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 14/935,575

(22) Filed: Nov. 9, 2015

(65) Prior Publication Data

US 2017/0130835 A1    May 11, 2017

(51) Int. Cl.
*F16H 9/18* (2006.01)
*F16H 61/662* (2006.01)
*B60W 10/107* (2012.01)

(52) U.S. Cl.
CPC ......... *F16H 61/66272* (2013.01); *F16H 9/18* (2013.01); *B60W 10/107* (2013.01); *F16H 2061/66204* (2013.01); *Y10T 477/624* (2015.01); *Y10T 477/6237* (2015.01); *Y10T 477/6242* (2015.01)

(58) Field of Classification Search
CPC ..................... F16H 61/662; F16H 9/18; F16H 2061/66204; F16H 61/66231; F16H 61/66272; B60W 10/107; Y10T 477/624; Y10T 477/6237; Y10T 477/6242

USPC .......................................................... 701/61
See application file for complete search history.

(56) References Cited

U.S. PATENT DOCUMENTS

| 5,931,884 A * | 8/1999 | Ochiai ............. F16H 61/66259 477/101 |
| 9,545,929 B1 * | 1/2017 | Zhang ................. B60W 30/188 |
| 2004/0171458 A1 * | 9/2004 | Iida ................... F16H 61/66254 477/44 |
| 2007/0298918 A1 * | 12/2007 | Toyoda ............. F16H 61/66259 474/28 |
| 2008/0146409 A1 * | 6/2008 | Yamaguchi ....... F16H 61/66259 477/44 |
| 2008/0153665 A1 * | 6/2008 | Uchiyama ............... F16H 61/12 477/49 |
| 2012/0090937 A1 | 4/2012 | Samie et al. |
| 2013/0130863 A1 | 5/2013 | Xu et al. |
| 2014/0074366 A1 | 3/2014 | Cui et al. |

* cited by examiner

*Primary Examiner* — Roger Pang
(74) *Attorney, Agent, or Firm* — Quinn IP Law

(57) ABSTRACT

A powertrain system including an internal combustion engine rotatably coupled to a variator of a continuously variable transmission (CVT) is described. A method for controlling the CVT includes determining a first speed ratio change rate based upon a desired speed ratio and a commanded speed ratio, and determining a commanded speed ratio trajectory based upon the first speed ratio change rate, an actual speed ratio and a commanded speed ratio. A ratio change coefficient and a force ratio factor are determined based upon the commanded speed ratio trajectory. A shift force is determined based upon the ratio change coefficient and a total speed ratio change rate. A primary pulley pressure and a secondary pulley pressure for the CVT are controlled based upon the shift force and the force ratio factor.

20 Claims, 2 Drawing Sheets

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of continuously changing an output/input speed ratio over a range between a minimum (underdrive) ratio and a maximum (overdrive) ratio, thus permitting infinitely variable selection of engine operation that achieves a preferred balance of fuel consumption and engine performance in response to an output torque request.

Known chain-type continuously variable transmissions include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley and the other pulley may operate as a driven or output pulley. The gear ratio is the ratio of the torque of the driven pulley to the torque of the drive pulley. The gear ratio may be changed by urging the two sheaves of one of the pulleys closer together and urging the two sheaves of the other pulley farther apart, causing the chain to ride higher or lower on the respective pulley.

SUMMARY

A powertrain system including an internal combustion engine rotatably coupled to a variator of a continuously variable transmission (CVT) is described. A method for controlling the CVT includes determining a first speed ratio change rate based upon a desired speed ratio and a commanded speed ratio, and determining a commanded speed ratio trajectory based upon the first speed ratio change rate, an actual speed ratio and a commanded speed ratio. A ratio change coefficient and a force ratio factor are determined based upon the commanded speed ratio trajectory. A shift force is determined based upon the ratio change coefficient and a total speed ratio change rate. A primary pulley force and a secondary pulley force for the CVT are controlled based upon the shift force and the force ratio factor.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
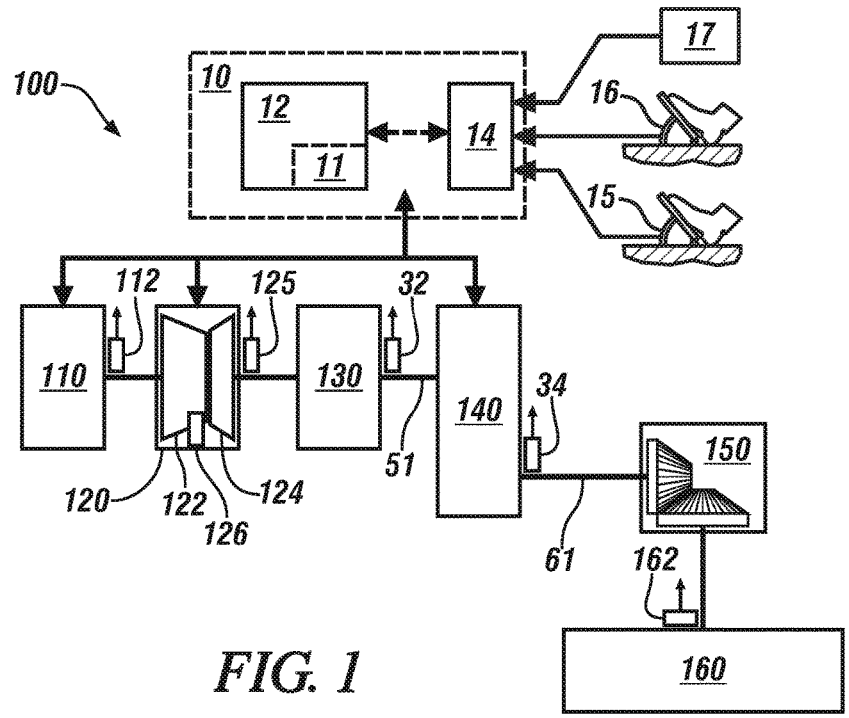
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162. Each of the aforementioned speed sensors may be any suitable position/speed sensing device, such as a Hall-effect sensor. Each of the aforementioned speed sensors communicates with the control system 10. As used herein the term 'speed' and related terms refer to a rotational speed of a rotating member, unless specifically indicated otherwise. As used herein the term 'position' and related terms refer to a rotational or angular position of a rotating member, unless specifically indicated otherwise.

The control system 10 preferably includes one or a plurality of controllers 12 and a user interface 14. A single controller 12 is shown for ease of illustration. The controller 12 may include a plurality of controller devices wherein each of the controllers 12 is associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch. The controller 12 preferably includes a memory device 11 containing executable instruction sets. The user interface 14 communicates with and monitors operator input devices including, e.g., an accelerator pedal 15, a brake pedal 16 and a transmission gear selector 17. The user interface 14 determines an operator torque request based upon the aforementioned operator inputs. In one embodiment, the transmission gear selector 17 includes a tap-up/tap-down feature, whereby a vehicle operator may manually select a transmission gear ratio, thus overriding transmission control. A tap-up command results in a command to the CVT 140 to increase its gear ratio, which is accomplished by increasing a speed ratio in the CVT 140. A tap-down command results in a command to the CVT 140 to decrease its gear ratio by decreasing the speed ratio in the CVT 140.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
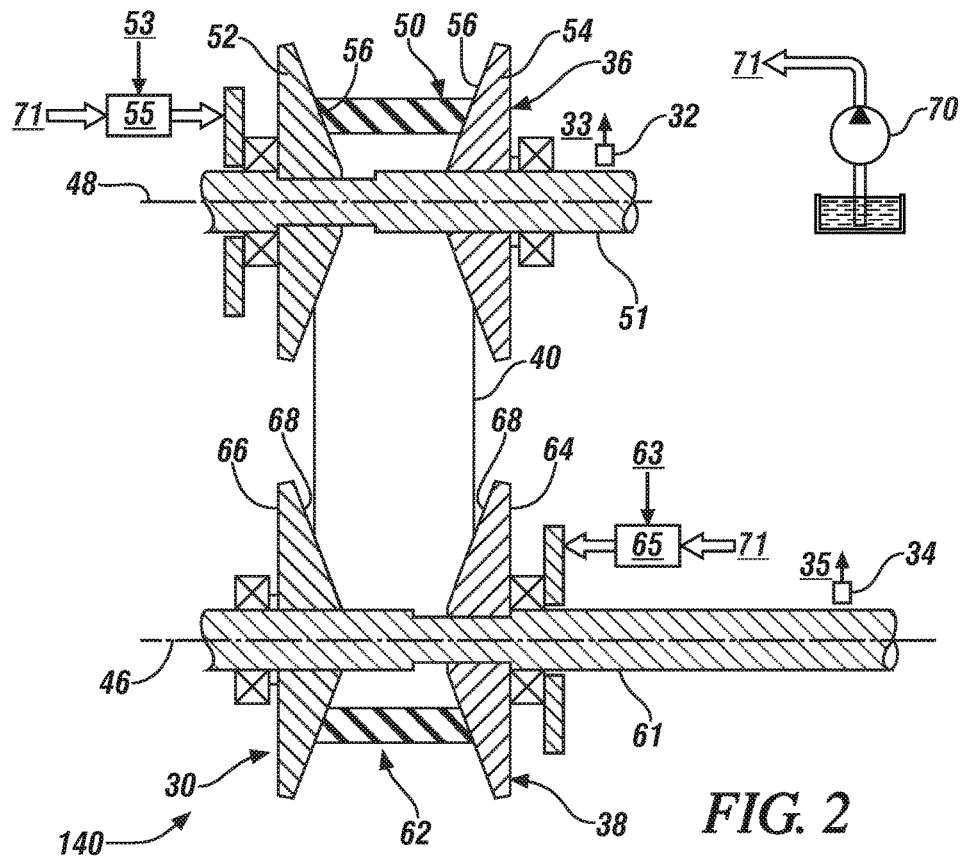
FIG. 2 schematically illustrates elements of a variator of a chain-type CVT, in accordance with the disclosure.

FIG. 2 schematically illustrates elements of one embodiment of a variator 30 of a chain-type continuously variable transmission (CVT) 140 that is advantageously controlled by a controller 12. The variator 30 transfers torque between the first rotating member 51 and the second rotating member 61. The first rotating member 51 is nominally referred to herein as input member 51, and the second rotating member 61 is nominally referred to herein as output member 61. In one embodiment, a hydraulic pump 70 fluidly couples to elements of the variator 30 to supply pressurized hydraulic fluid via a hydraulic circuit 71.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween. As used herein, the term 'speed ratio' refers to a variator speed ratio, which is a ratio of a CVT output speed and a CVT input speed. The CVT input speed may be determined based upon a signal input from one of the engine speed sensor 112, the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor. The speed ratio parameters are determined based upon the CVT input speed and the CVT output speed.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustoconical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a drive signal 53, including urging the moveable first sheave 52 towards the stationary first sheave 54. In one embodiment, the actuator 55 is a hydraulically-controlled device, e.g., a valve that fluidly couples to the hydraulic circuit 71 and the drive signal 53 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween. The opposed second grooved surfaces 68 preferably form an inverted frustoconical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a driven signal 63, including urging the moveable second sheave 64 towards the stationary second sheave 66. In one embodiment, the actuator 65 is a hydraulically-controlled device, e.g., a valve that fluidly couples to the hydraulic circuit 71 and the drive signal 63 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

Control routines for embodiments of the powertrain system 100 including the engine 110 and CVT 140 may be implemented to provide tractive effort when employed on a vehicle. One purpose of a control routine may be to track commanded operating states with zero or minimal steady-state tracking error and with rapid, smooth responsiveness to output torque requests. This includes accounting for and controlling system operation, including engine torque management, system capabilities such as hydraulic line pressures in the transmission, system and component temperatures, measurement capabilities of sensors, and other factors.

Figure 3:
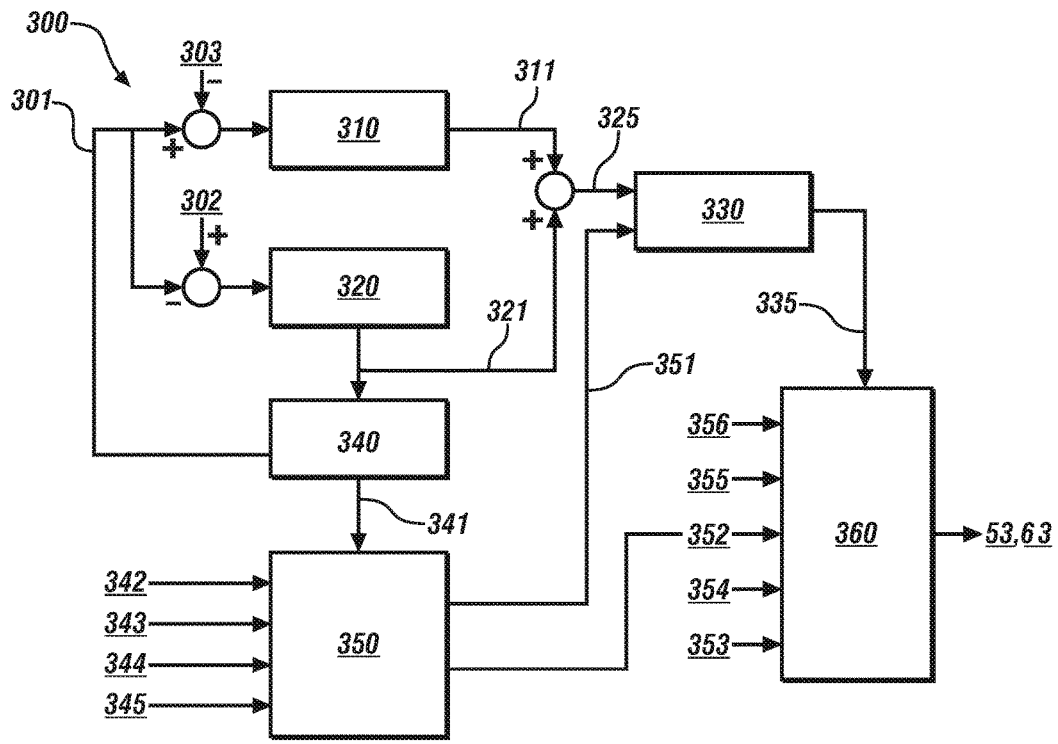
FIGS. 3 and 4 schematically show block diagrams of a speed ratio control routine that can be employed in controlling a variator speed ratio in a CVT, in accordance with the disclosure.
Figure 4:
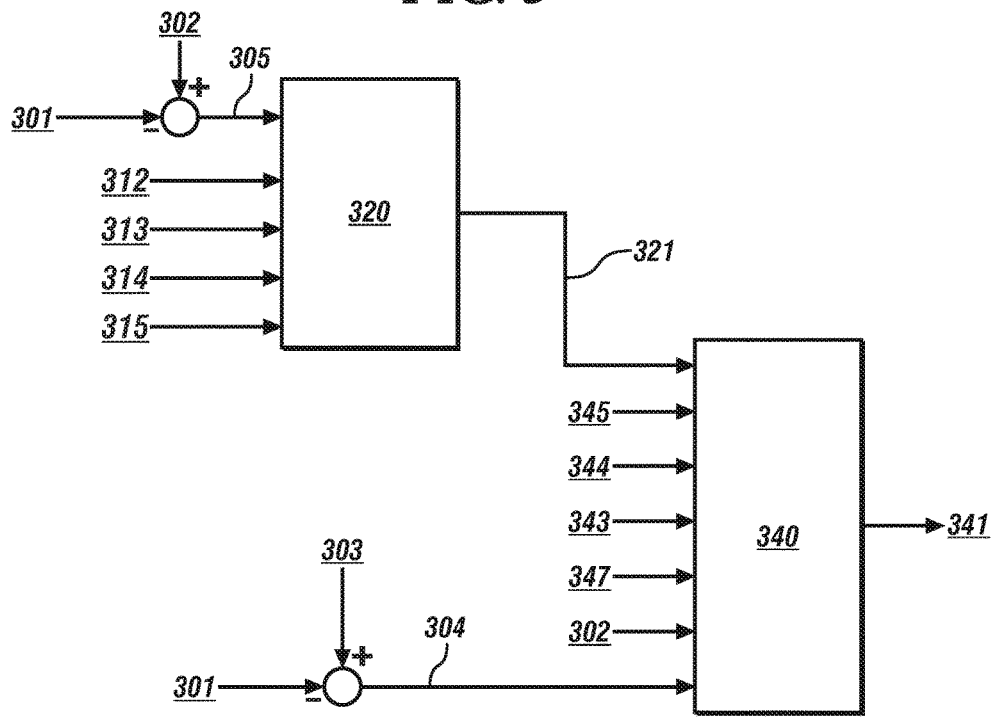

FIGS. 3 and 4 schematically shows a block diagram of a speed ratio control routine (routine) 300 that may be advantageously employed in controlling a CVT speed ratio in an embodiment of the CVT 140 shown with reference to FIGS. 1 and 2.

The CVT speed ratio may be controlled by controlling force exerted on the primary pulley 36, e.g., a primary pulley pressure command, and by controlling force exerted on the secondary pulley 38, e.g., a secondary pulley pressure, which may be calculated or otherwise determined based on a minimum pulley clamping force, a shift force and an Ide model, as described herein. Speed ratio parameters of the routine 300 include a commanded speed ratio 301, a desired speed ratio 302 and an actual speed ratio 303. The actual speed ratio 303 indicates a present, measured value for the speed ratio and is determined based upon a ratio of measured input and output speeds, e.g., the CVT input speed 33 as measured by the input speed sensor 32 and the CVT output speed 35 as measured by the output speed sensor 34. The desired speed ratio 302 is a preferred speed ratio for operating the CVT 140 in the powertrain system 100 that is responsive to the operator torque request and balances or otherwise accounts for factors related to drivability, fuel consumption, emissions, and other operating conditions that may be monitored or estimated and relate to an output power command, vehicle speed and engine torque. The commanded speed ratio 301 is a speed ratio that is commanded by the controller for implementation during execution of a next iteration of the routine 300, or is an achievable target ratio. As described herein, the controller 12 controls the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

A first portion of the routine 300 includes using feed-forward control and feedback control to determine a total speed ratio change rate 325 based upon the commanded speed ratio 301, the desired speed ratio 302 and the actual speed ratio 303. The feedback control employs a controller 310 that determines a feedback ratio rate 311 based upon a difference between the commanded speed ratio 301 and the actual speed ratio 303. The controller 310 may be any suitable feedback control device, including by way of non-limiting examples, a proportional-integral-derivative (PID) controller, an optimal robust controller, or a model predictive control (MPC) device. The feed-forward control employs a feed-forward controller 320 that determines a feed-forward speed ratio rate 321 based upon a difference between the commanded speed ratio 301 and the desired speed ratio 302. The total speed ratio change rate 325 may be determined by combining the feedback ratio rate 311 and the feed-forward speed ratio rate 321, for example by calculating an arithmetic sum thereof. The feed-forward speed ratio rate 321 and the commanded speed ratio 301 are evaluated in a trajectory controller 340, which determines a commanded speed ratio trajectory 341 based thereon.

As best shown with reference to FIG. 4, the feed-forward controller 320 determines the feed-forward speed ratio rate 321 based upon a desired ratio error 305 and related factors 312. The desired ratio error 305 is a difference between the commanded speed ratio 301 and the desired speed ratio 302.

The feed-forward controller 320 takes into account vehicle operating conditions and operator inputs to the accelerator pedal 15, the brake pedal 16 and the transmission gear selector 17, including the tap-up/tap-down feature. The related factors 312 include, by way of non-limiting examples, transmission temperature, input speed and input torque, with a limitation on available force that is based upon capability of the hydraulic pump and system, line pressure, and a present force of the secondary pulley 38. A first control flag 313 may be employed to indicate whether or not to employ the feed-forward speed ratio rate 321.

When a change in the desired speed ratio 302 is a ramp-change, the feed-forward controller 320 determines the feed-forward speed ratio rate 321 as follows:

$$\text{Rate} = (\text{DsrdRatio} - \text{CmndRatio}) * \text{FeedFwdGain} \quad [1]$$

wherein:
DsrdRatio is the desired speed ratio 302,
CmndRatio is the commanded speed ratio 301, and
FeedFwdGain is a gain factor, which is calibratable.

When a change in the desired speed ratio 302 is a step-change, the feed-forward controller 320 determines the first speed ratio change rate 321 as follows:

$$\text{Rate} = -(No * \text{AccelProf})/Ni^2 \quad [2]$$

wherein:
Ni is the CVT input speed 33,
No is the CVT output speed 35, and
AccelProf is a commanded acceleration profile for the input member 51 of the CVT 140. In certain embodiments, the first speed ratio change rate 321 is a calibrated value that may be determined based upon the vehicle speed, input torque, the speed ratio, and a torque capacity ratio.

Operating conditions in which the desired speed ratio 302 is a step-change include a response to an operator tap-up/tap-down input to the transmission gear selector 17, or when an operator steps out of the accelerator pedal 15 to decelerate the vehicle.

When an operator input to the brake pedal 16 indicates an urgent request to decelerate and stop forward movement of the vehicle, the feed-forward controller 320 determines the feed-forward speed ratio rate 321 as follows:

$$\text{Rate} = \text{PumpLimited}R\text{dot} \quad [3]$$

wherein:
PumpLimitedRdot a maximum achievable time-rate change in the speed ratio limited only by the fluidic pressure capability of the hydraulic pump 70.

The first control flag 313 indicates whether to employ the feed-forward speed ratio rate 321 based upon monitored operating conditions. The feed-forward controller 320 may opt to not determine the feed-forward speed ratio rate 321 based upon the desired ratio error 305 and hardware limitations 312 of the variator 140. This may include conditions related to uncertainty in speed measurement, such as at low speed operating conditions when a speed of one of the first and second pulleys 36, 38 is less than a speed at which it can be accurately measured employing one of the speed sensors 32, 34. This may also include conditions when there is a transition in speed of one of the first and second pulleys 36, 38 from the low speed condition to a speed condition that is not low speed. When the first control flag 313 is set, i.e., equal to a logic 1, the feed-forward speed ratio rate 321 is set equal to zero. When the first control flag 313 is reset, i.e., equal to a logic 0, the feed-forward speed ratio rate 321 is set as described herein. Thus, when operating at low pulley speeds or in a transition in the pulley speeds from a low speed condition to a condition that is not low speed, the feed-forward speed ratio rate 321 may be commanded to zero.

The trajectory controller 340 determines the commanded speed ratio trajectory 341 based upon the feed-forward speed ratio rate 321 and a commanded ratio error 304, which is determined based upon a difference between the commanded speed ratio 301 and the actual speed ratio 303, and also by accounting for the hardware limitations 312 of the variator 140, e.g., hydraulic line pressure, and by accounting for drivability concerns. Inputs to the trajectory controller 340 include the transmission temperature 345, the input speed 344, the input torque 343, and the desired speed ratio 302, and a second control flag 347 indicating a command to use the desired speed ratio 302 as the commanded speed ratio 301. When the speed ratio change rate is commanded to zero, the commanded speed ratio trajectory 341 remains at the previously commanded value based upon the actual speed ratio 303 determined at the last calculated value before pulley speeds became low. This condition remains active until the desired speed ratio 302 is within a threshold difference from the measured speed ratio 303 or a timer expires.

The commanded speed ratio trajectory 341 is determined by integrating the feed-forward speed ratio rate 321 with a variable coefficient that is determined based upon the commanded speed ratio 301 and a speed ratio error that is equal to a difference between the actual speed ratio 303 and the commanded speed ratio 301.

The commanded speed ratio trajectory 341 may constrained by the hardware for minimum and maximum speed ratio. The integration may also be reset when the second control flag 347 indicating a command to use the desired speed ratio 302 as the commanded speed ratio 301 is TRUE. The second control flag 347 indicating the command to use the desired speed ratio 302 as the commanded speed ratio 301 may be set to TRUE when, during an upshift maneuver, the actual speed ratio 303 is greater than the desired speed ratio 302, and the desired speed ratio 302 is greater than the commanded speed ratio 301. The second control flag 347 indicating the command to use the desired speed ratio 302 as the commanded speed ratio 301 may also be set to TRUE when, during a downshift maneuver, the actual speed ratio 303 is less than the desired speed ratio 302, and the desired speed ratio 302 is less than the commanded speed ratio 301. Under such conditions, the commanded speed ratio 301 is reset to the desired speed ratio 302.

The commanded speed ratio trajectory 341 may be shaped as a function of the desired speed ratio, current commanded speed ratio and current measured speed ratio. This includes calculating the commanded ratio trajectory that takes into consideration line pressure and drivability. The commanded speed ratio trajectory as determined herein accommodates entering or exiting special ratio changes such as occurs in response to step upshifts or step downshifts. The commanded speed ratio trajectory accounts for geometric hardware limits for the minimum and maximum ratio in the computation of the trajectory. The commanded speed ratio trajectory may be altered when there is a likelihood of measurement uncertainty.

The commanded speed ratio trajectory 341 is input to an Ide model 350, which determines a ratio change coefficient 351 based upon the commanded speed ratio trajectory 341 for an embodiment of the CVT 140, and determines a force ratio factor (KpKs) 352 for the relationship of primary pulley force and secondary pulley force. The Ide model 350 includes processor-executable code and an associated calibration that simulates physical relationships associated with operation of an embodiment of the CVT 140. Ide models and their development and implementation are known and thus not described in detail herein. The physical relationships may be reduced to the following executable relationship for a variator ratio derivative ṙ, wherein the variator ratio derivative ṙ corresponds to the commanded speed ratio trajectory 341, i.e., indicates a time-rate change in the commanded speed ratio 301. The variator ratio derivative ṙ may be represented as follows, and combines a feedback ratio rate and a feed-forward ratio rate:

$$\dot{r}=k(VSR,\omega_p)*F_{shift} \quad [4]$$

The shift force $F_{shift}$ may be determined as follows:

$$F_{shift}=F_{prim}-KpKs(VSR,TCR)F_{sec} \quad [5]$$

The terms of Eqs. 4 and 5 include as follows:

$F_{prim}$ is a force associated with the first, or primary pulley 36, which takes into account related pressure forces and centrifugal forces;

$F_{sec}$ is a force associated with the second, or secondary pulley 38, which takes into account related pressure forces, centrifugal forces, and spring forces;

$\omega_p$ is the CVT input speed;

k is a ratio change coefficient 351;

KpKs is the force ratio factor 352;

TCR is the torque capacity ratio 342 for the embodiment of the CVT 140; and VSR is the desired speed ratio 302.

Under steady state operating conditions:

$$KpKs=F_{prim}/F_{sec} \text{ and } F_{shift}=0 \quad [6]$$

The relationship for the variator ratio derivative ṙ described with reference to Eqs. 4 and 5 may be developed for an embodiment of the CVT 140 employing empirical data that may be collected for a range of speed, load and speed ratio conditions and analyzed to determine states for the various factors and coefficients. The force ratio factor KpKs 352 represents a ratio of $F_{prim}$ and $F_{sec}$ that accounts for forces from hydraulic pressure, centrifugal pressure and spring force, and may be empirically derived employing the commanded speed ratio 301 and a torque capacity ratio 342. The force ratio factor KpKs 352 is dependent upon an input pulley torque 343, CVT input speed 33, CVT output speed 35, transmission fluid temperature 345, transmission fluid quality and other factors. The ratio change coefficient k 351 is a calibrated term that is determined using empirical data related to operation of an embodiment of the CVT 140. The ratio change coefficient k 351 and the total speed ratio change rate 325 are employed by the shift force calculation routine 330 to determine a commanded shift force Fshift-cmd 335. The commanded shift force Fshift-cmd 335 is a magnitude of additional force exerted on the first pulley 36 or the second pulley 38 to change the speed ratio in response to a shift command.

A pulley pressure determination routine 360 employs the commanded shift force Fshift-cmd 335 and the force ratio factor KpKs 352 to determine primary and secondary pulley pressure commands for controlling the CVT 140, taking into account a minimum pulley clamping force 356, centrifugal force 355, a spring force 354 and a torque force coefficient 353. The minimum pulley clamping force 356, centrifugal force 355, spring force 354 and torque force coefficient 353 are application-specific parameters that may be determined based upon empirical relationships. As such, the primary and secondary pulley pressure commands for controlling the CVT 140 are based on the desired forces (including clamping and feedback correction forces) and the hydraulic characteristics of the transmission at the specific operating conditions.

The pulley pressure determination routine 360 determines the primary pulley pressure command, e.g., the drive signal 53 for the variator 30 described with reference to FIG. 2, and also determines the secondary pulley pressure command, e.g., the driven signal 63 for the variator 30 described with reference to FIG. 2, to control actuators of the CVT 140 to adjust the speed ratio of the CVT 140.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a continuously variable transmission (CVT), the method comprising:
    determining a first speed ratio change rate based upon a desired speed ratio and a commanded speed ratio;
    determining a commanded speed ratio trajectory based upon the first speed ratio change rate, an actual speed ratio and a commanded speed ratio;
    determining a ratio change coefficient and a force ratio factor based upon the commanded speed ratio trajectory;
    determining a shift force based upon the ratio change coefficient and a total speed ratio change rate; and
    controlling, via a controller, a primary pulley force and a secondary pulley force for the CVT based upon the shift force and the force ratio factor.

2. The method of claim 1, further comprising controlling the primary pulley pressure and the secondary pulley pressure for the CVT based upon the shift force, the force ratio factor, a minimum pulley clamping force, a centrifugal force and a spring force for the CVT.

3. The method of claim 1, wherein determining the first speed ratio change rate based upon the desired speed ratio and the commanded speed ratio comprises determining the first speed ratio change rate based upon a difference between the desired speed ratio and the commanded speed ratio multiplied by a feed-forward gain factor when a change in the desired speed ratio is a ramp rate change.

4. The method of claim 1, wherein determining the first speed ratio change rate based upon the desired speed ratio and the commanded speed ratio comprises determining the first speed ratio change rate in accordance with:

Rate=−(No*AccelProf)/Ni² wherein:
Rate is the first speed ratio change rate,
Ni is a CVT input speed,
No is a CVT output speed, and
AccelProf is a commanded acceleration profile of an input member of the CVT when a change in the desired speed ratio is a step change.

5. The method of claim 4, wherein the desired speed ratio is a step change in response to a tap-up/tap-down input to a transmission gear selector.

6. The method of claim 1, wherein determining the first speed ratio change rate based upon the desired speed ratio and the commanded speed ratio comprises determining the first speed ratio change rate as a maximum achievable time-rate change in the speed ratio limited only by a fluidic pressure capability of a hydraulic pump supplying pressurized hydraulic fluid to the CVT.

7. The method of claim 1, wherein determining the commanded speed ratio trajectory comprises integrating the first speed ratio change rate employing a variable coefficient that is based upon a difference between the actual speed ratio and the commanded speed ratio.

8. The method of claim 1, wherein the total speed ratio change rate is determined based upon the actual speed ratio, the desired speed ratio and the commanded speed ratio, comprising:
determining a feedback ratio rate based upon a difference between the commanded speed ratio and the actual speed ratio;
determining a ratio change rate based upon a difference between the commanded speed ratio and the desired speed ratio; and
combining the feedback ratio rate and the ratio change rate.

9. The method of claim 1, wherein determining the ratio change coefficient based upon the commanded speed ratio trajectory comprises analyzing empirical data to develop a relationship for a variator ratio derivative $\dot{r}$ in accordance with the following equations:

$\dot{r}=k(VSR,\omega_p)*F_{shift}$ and $F_{shift}=F_{prim}-KpKs(VSR,TCR)F_{sec}$ wherein:
k is the ratio change coefficient,
VSR is the desired speed ratio,
$F_{prim}$ is a force associated with a primary pulley of a variator of the VSR,
$F_{sec}$ is a force associated with a secondary pulley of the variator of the VSR,
$F_{shift}$ is the shift force,
$\omega_p$ is CVT input speed,
KpKs is the force ratio factor, and
TCR is a torque capacity ratio for the CVT; and
wherein the variator ratio derivative $\dot{r}$ corresponds to the commanded speed ratio trajectory.

10. The method of claim 1, wherein determining a force ratio factor based upon the commanded speed ratio trajectory comprises analyzing empirical data to develop a relationship for a variator ratio derivative $\dot{r}$ in accordance with the following equation:

$\dot{r}=k(VSR,\omega_p)*[F_{prim}-kpks(VSR,TCR)F_{sec}]$ wherein:
VSR is the desired speed ratio,
$F_{prim}$ is a force associated with a primary pulley of a variator of the VSR,
$F_{sec}$ is a force associated with a secondary pulley of the variator of the VSR,
$\omega_p$ is CVT input speed,
k is the ratio change coefficient determined based upon a ratio of $F_{prim}$ and $F_{sec}$
kpks is the force ratio factor, and
TCR is a torque capacity ratio for the CVT.

11. The method of claim 1, wherein controlling the primary pulley pressure for the CVT based upon the shift force and the force ratio factor comprises controlling a primary pressure command to drive an actuator of a moveable sheave of the primary pulley of a variator of the CVT in response to the shift force and the force ratio factor.

12. The method of claim 1, wherein controlling the secondary pulley pressure for the CVT based upon the shift force and the force ratio factor comprises controlling a secondary pressure command to drive an actuator of a moveable sheave of the secondary pulley of a variator of the CVT in response to the shift force and the force ratio factor.

13. The method of claim 1, wherein the actual speed ratio comprises a measured value determined based upon a ratio of a CVT input speed and a CVT output speed.

14. The method of claim 1, wherein the desired speed ratio comprises speed ratio for operating the CVT that is responsive to the operator torque and vehicle speed.

15. The method of claim 1, wherein the commanded speed ratio comprises a speed ratio that is achievable with a zero steady-state tracking error.

16. A continuously variable transmission (CVT), comprising:
a variator including a first pulley and a second pulley, the first and second pulleys rotatably couple by a flexible continuous rotatable device, wherein the first pulley rotatably couples to an input member and the second pulley rotatably couples to an output member;
the first pulley including a moveable sheave that translates along a first axis relative to a stationary sheave in response to urging of a first actuator;
the second pulley including a moveable sheave that translates along a second axis relative to a stationary sheave in response to urging of a second actuator;
a controller, in communication with a first sensor configured to monitor a first speed associated with the first pulley and a second sensor configured to monitor a second speed associated with the second pulley, and operatively connected to the first and second actuators;
the controller including an instruction set, the instruction set executable to:
determine a first speed ratio change rate based upon a desired speed ratio and a commanded speed ratio,
determine a commanded speed ratio trajectory based upon the first speed ratio change rate, an actual speed ratio and a commanded speed ratio,
determine a ratio change coefficient and a force ratio factor based upon the commanded speed ratio trajectory,
determine a shift force based upon the ratio change coefficient and a total speed ratio change rate, and
control a primary pulley pressure and a secondary pulley pressure for the CVT based upon the shift force, a minimum pulley clamping force, and the force ratio factor.

17. The CVT of claim 16, wherein determining the first speed ratio change rate based upon the desired speed ratio and the commanded speed ratio comprises determining the first speed ratio change rate based upon a difference between the desired speed ratio and the commanded speed ratio multiplied by a feed-forward gain factor when a change in the desired speed ratio is a ramp rate change.

18. The CVT of claim 16, wherein determining the first speed ratio change rate based upon the desired speed ratio and the commanded speed ratio comprises determining the first speed ratio change rate in accordance with:

$$\text{Rate} = -(No * \text{AccelProf})/Ni^2$$

wherein:
- Rate is the first speed ratio change rate,
- Ni is a CVT input speed,
- No is a CVT output speed, and
- AccelProf is a commanded acceleration profile of an input member of the CVT when a change in the desired speed ratio is a step change.

19. The CVT of claim 18, wherein the desired speed ratio is a step change in response to a tap-up/tap-down input to a transmission gear selector.

20. The CVT of claim 18, wherein the desired speed ratio is a step change in response to a step-out maneuver to an accelerator pedal.

* * * * *